United States Patent
Martinelli et al.

(10) Patent No.: US 8,152,370 B2
(45) Date of Patent: Apr. 10, 2012

(54) SENSOR AND METHOD FOR DETERMINING TEMPERATURE ALONG AN OPTICAL FIBRE

(75) Inventors: Mario Martinelli, San Donato Milanese (IT); Riccardo Belli, Vedano Al Lambro (IT)

(73) Assignee: Politecnico Di Milano, Milan (IT)

( * ) Notice: Subject to any disclaimer, the term of this patent is extended or adjusted under 35 U.S.C. 154(b) by 191 days.

(21) Appl. No.: 12/670,869

(22) PCT Filed: Jul. 25, 2008

(86) PCT No.: PCT/IB2008/001947
§ 371 (c)(1),
(2), (4) Date: Jan. 27, 2010

(87) PCT Pub. No.: WO2009/016458
PCT Pub. Date: Feb. 5, 2009

(65) Prior Publication Data
US 2010/0220765 A1 Sep. 2, 2010

(30) Foreign Application Priority Data
Jul. 31, 2007 (IT) ................ BG2007A0042

(51) Int. Cl.
*G01K 11/00* (2006.01)
(52) U.S. Cl. ........................ 374/161; 374/131
(58) Field of Classification Search .............. 374/161, 374/131
See application file for complete search history.

(56) References Cited

U.S. PATENT DOCUMENTS

| | | | | |
|---|---|---|---|---|
| 4,767,219 A | * | 8/1988 | Bibby | 374/123 |
| 4,823,166 A | * | 4/1989 | Hartog et al. | 356/44 |
| 5,272,334 A | * | 12/1993 | Sai | 250/227.21 |
| 5,765,948 A | | 6/1998 | Sai | |
| 6,380,534 B1 | | 4/2002 | Farhadiroushan et al. | |
| 2003/0234921 A1 | | 12/2003 | Yamate et al. | |
| 2006/0245468 A1 | * | 11/2006 | Hartog | 374/161 |
| 2007/0165691 A1 | | 7/2007 | Taverner et al. | |
| 2007/0223556 A1 | * | 9/2007 | Lee et al. | 374/1 |
| 2010/0124250 A1 | * | 5/2010 | Lachenmeier et al. | 374/152 |
| 2010/0128756 A1 | * | 5/2010 | Lee et al. | 374/161 |

* cited by examiner

*Primary Examiner* — Lisa Caputo
*Assistant Examiner* — Mirellys Jagan
(74) *Attorney, Agent, or Firm* — Ladas & Parry LLP

(57) ABSTRACT

An optical fiber temperature sensor comprising: an optical pulse generator; an optical fiber into which said optical pulses are fed; an optical receiver to receive said optical pulses reflected by said optical fiber and to convert them into an electrical signal; a processor which receives said electrical signal and determines the temperature along said optical fiber; said optical receiver comprising a first filter and a second filter to filter said optical pulse reflected by said optical fiber, characterized in that said first and said second filters filter two adjacent portions of anti-Stokes optical signals or of Stokes optical signals.

18 Claims, 3 Drawing Sheets

SENSOR AND METHOD FOR DETERMINING TEMPERATURE ALONG AN OPTICAL FIBRE

BACKGROUND TO THE INVENTION

1. Field of the Invention

The present invention relates to an optical fibre temperature sensor and to a method for determining temperature along an optical fibre.

2. Technical Background of the Invention

It relates in particular to an optical fibre temperature sensor of Raman type for the distributed monitoring of temperature along medium/high voltage electric cables. The sensor is however adaptable to other applications such as fire prevention monitoring within boreholes/tunnels, monitoring of gas/oil pipelines and for all those industrial applications requiring constant continuous temperature control along medium/long distances of interest.

Numerous patents are present on the subject of optical fibre sensors for distributed temperature measurement, these discussing the filtration/separation of the different spectral components used in temperature measurement.

To provide a reliable measurement of temperature distribution along the fibre sensor an appropriate normalization of the temperature curve must be carried out, i.e. the measurement must be normalized with reference to possible mechanical losses in the fibre sensor.

The compensation techniques typically used comprise analysis of the Stokes-anti Stokes spectral components; or analysis of the Rayleigh-anti Stokes spectral components For example, the spectral component of Rayleigh scattering is analyzed and used as reference for temperature distribution compensation. In this respect, analysis of the Rayleigh signal component enables attenuation distribution along the sensor fibre to be determined. Knowing this pattern it is possible, by simultaneously analyzing temperature distribution and attenuation distribution, to discriminate the effects of temperature and those related to possible mechanical stresses or micro-bending phenomena induced by the sensor fibre. In this manner, temperature evaluation along the sensor fibre is more accurate and free of measurement errors.

If measurement accuracy is to be improved, several sources with different probe wavelengths could be used. In this manner, by using a suitable filtration system, the attenuation distribution along the fibre can be obtained for each source used.

This enables a more accurate reconstruction of attenuation distribution based on the probe wavelength and hence more effective compensation for losses due to mechanical stresses or micro-bending phenomena.

The Rayleigh spectral component can also be filtered if a compensation technique is to be used which evaluates the ratio, in terms of power, between the Raman anti-Stokes and Raman Stokes spectral components. This technique typically enables a clear and precise evaluation of temperature distribution but does not normally enable those effects related to temperature to be effectively discriminated from those due to losses of a mechanical nature or to reflection phenomena (splicing or connectors).

In both cases those components not used for normalization purposes are filtered out by suitable devices and not used for other purposes.

An object of the present invention is to provide an optical fibre temperature sensor and a method for determining temperature along an optical fibre able to obviate the drawbacks of the known art.

Another object is to a system which is of low cost while still providing high measurement performance.

These and further objects are attained, according to the present invention, by an optical fibre temperature sensor comprising: an optical pulse generator; an optical fibre into which said optical pulses are fed; an optical receiver to receive said optical pulses reflected by said optical fibre and to convert them into an electrical signal; a processor which receives said electrical signal and determines the temperature along said optical fibre; said optical receiver comprising a first filter and a second filter to filter said optical pulse reflected by said optical fibre, characterised in that said first and said second filters filter two adjacent portions of anti-Stokes optical signals or Stokes optical signals.

SUMMARY OF THE INVENTION

These objects are also attained by a method for determining temperature along an optical fibre, comprising the steps of: generating an optical pulse; feeding said optical pulse to an optical fibre; receiving said optical pulse reflected by said optical fibre and converting it into an electrical signal which determines the temperature along said optical fibre; filtering said optical pulse reflected by said optical fibre; characterised in that the filter step comprises the step of filtering two adjacent portions of anti-Stokes optical signals or Stokes optical signals Further characteristics of the invention are described in the dependent claims.

The Applicant has surprisingly noted that the ratio between two adjacent spectral windows pertaining to the Raman spectrum remains constant even when faced with a mechanical disturbance induced in the sensor fibre; preferably, the ratio between the components of two adjacent spectral windows of the Raman anti-Stokes signal.

The sensor uses a single mode standard fibre and preferably standard optical components for telecommunications, and enables temperature measurements to be obtained along long distances with excellent performance, excellent reliability and low cost.

Preferably, standard commercial filters complying with ITU (International Telecommunication Union) specifications are used, in particular recommendations G.671 and G.694.1. In this manner there is greater reliability of components required for implementing the sensor, and hence reliability of the sensor itself. In this respect, such standard devices are subjected to severe tests (Telcordia GR-1221).

The proposed scheme preferably enables not only the temperature distribution to be evaluated but also the attenuation distribution along the sensor fibre. The two measurements are made simultaneously but totally independently. The proposed optical scheme also enables application of a compensation technique, noted surprisingly by the Applicant, which enables the temperature measurement to be normalized with reference to possible mechanical losses in the sensor fibre. In this manner all the effects of a mechanical nature introduced by the fibre can be compensated, so increasing the precision and accuracy of the measurements effected.

The characteristics and the advantages of the present invention will be apparent from the ensuing detailed description of one embodiment thereof, illustrated by way of non-limiting example in the accompanying drawings, in which:

DETAILED DESCRIPTION OF THE INVENTION

Figure 1:
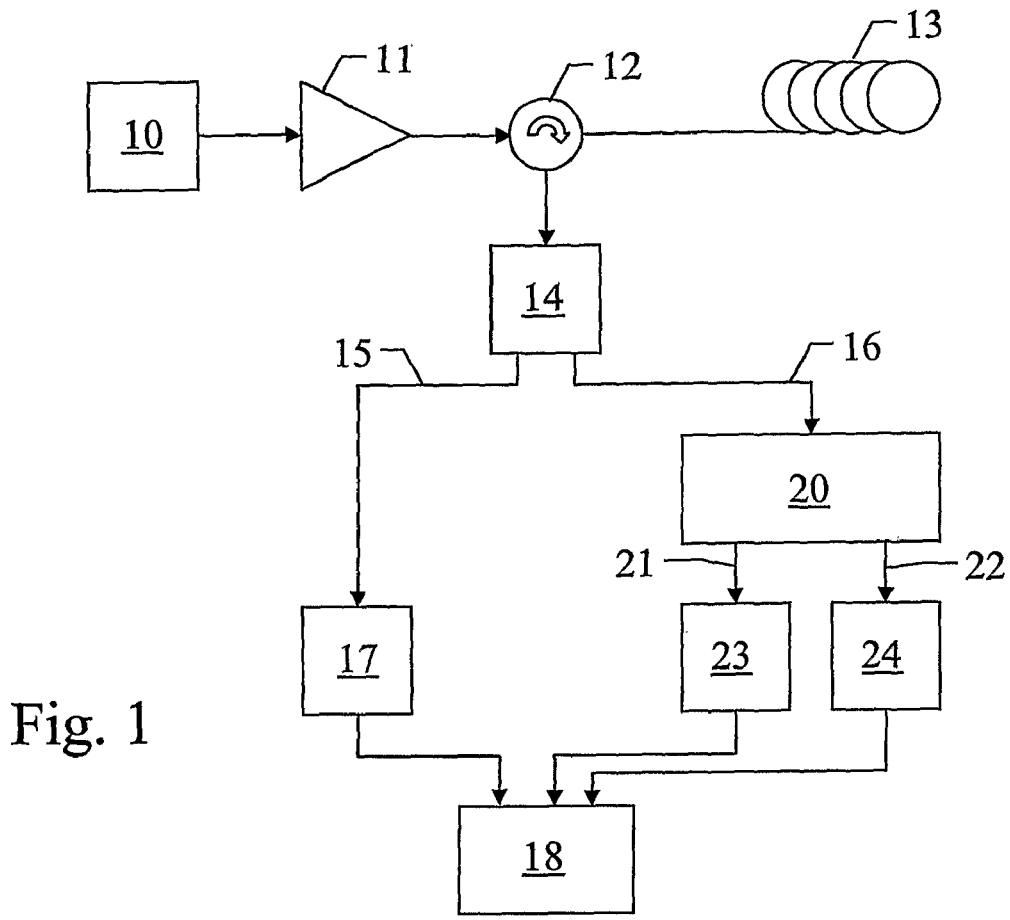
FIG. 1 shows schematically a block scheme of an embodiment of a sensor according to the present invention.

With reference to FIG. 1, an optical fibre temperature sensor according to the present invention comprises an optical pulse generator 10 consisting of a laser diode, for example DFB (distributed feedback) operating in the third window. The optical pulse may be amplified to a suitable power level using an optical amplifier 11, for example EDFA (Erbium doped fibre amplifier). The amplified optical pulse is coupled to one end of the sensor fibre 13 via a 3-port optical circulator 12. Other pulse-fibre coupling devices can be used.

The sensor fibre 13 is a standard optical fibre for telecommunications, for example a single mode fibre (SMF).

The retrodiffused signal from the sensor fibre 13 is addressed by the circulator 12 to an OADM (optical add drop multiplexer) 14, typically used in DWDM (dense wavelength division multiplexer) telecommunications systems.

This component 14, preferably formed by thin film or integrated optics technology, presents two output channels 15 and 16, with passband and stopband functions respectively.

Figure 2:
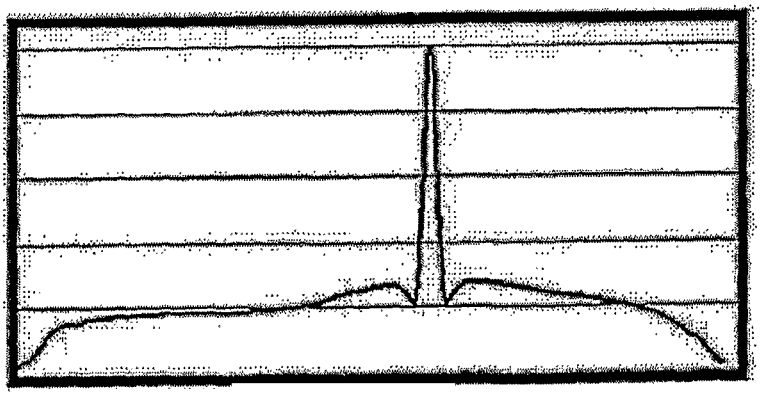
FIG. 2 shows schematically the complete optical spectrum reflected by a sensor fibre, according to the present invention.

The retrodiffused signal is of the type shown in FIG. 2, in which the Rayleigh scattering component peak, the Raman Stokes component on the right side and the Raman anti-Stokes component on the left side can be seen.

The attenuation curves for the two channels are complementary and enable the Rayleigh scattering component to be separated from the remaining retrodiffused spectral components, in particular of the Raman Stokes and Raman anti-Stokes component.

Figure 3:
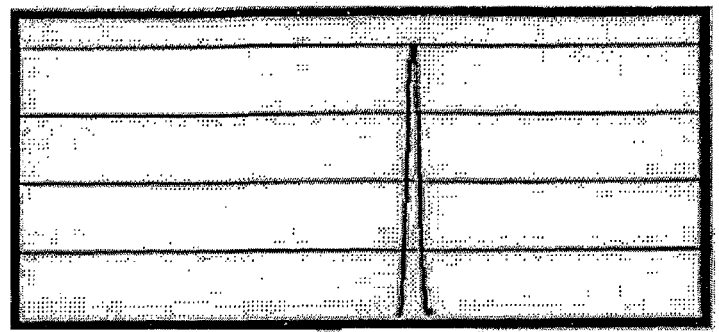
FIG. 3 shows schematically the optical spectrum reflected by a sensor fibre relative to just the Rayleigh signal, according to the present invention.

In particular, the filter which provides the signal to the channel 15 has a passband function, enabling just the Rayleigh component to be separated from the total optical spectrum of the retrodiffused signal, as in FIG. 3. This filter is characterised by a narrow passband, preferably a few hundreds of GHz. The chosen passband width must ensure that always and only the Rayleigh component is filtered. It must therefore be evaluated such that possible variations in the emission wavelength $\lambda_0$ of the generator 10 (caused by component thermal drift, component ageing, sensitivity to feed current) do not render this filtration ineffective. Experimentally it has been evaluated as using probe pulses of length typically tens of nanoseconds, thus taking into consideration all the causes of the aforesaid wavelength variations, to achieve adequate filtration a filter must be used with a drop channel characterised preferably by a passband of 200 GHz.

The Rayleigh signal is then detected by using a suitable photodetection system 17, preferably a photo diode with a TIA (trans-impedance amplifier) preamplification stage.

The electrical signal provided by the photodetection system 17 is applied to a processor 18.

From the received signal, the processor 18 is able, in known manner, to evaluate the attenuation distribution along the sensor fibre 13.

The filter which provides the signal to the channel 16 is used to attenuate just the Rayleigh spectral component, while leaving the remaining spectral components virtually unaltered, these being fed to an optical filtration circuit 20 to be suitably selected, to determine the temperature distribution along the sensor fibre.

Figure 4:
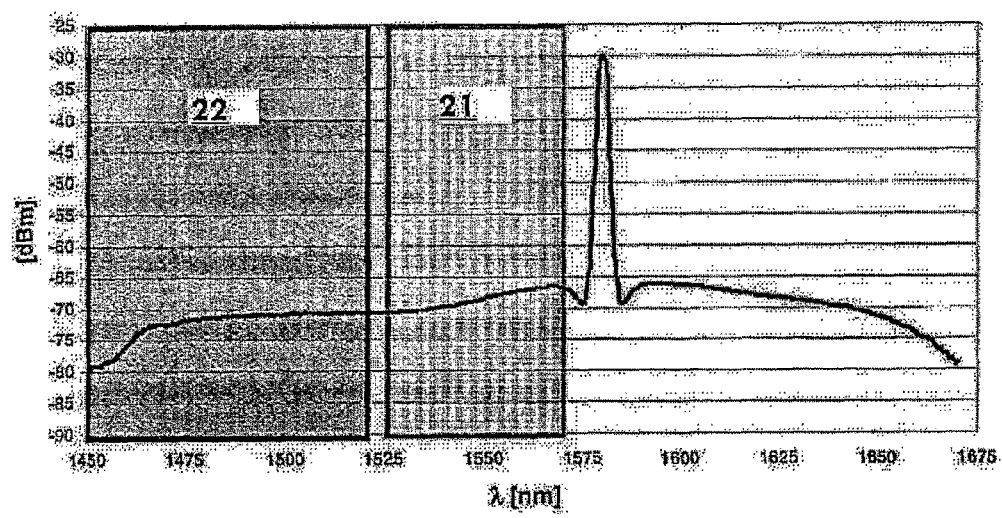
FIG. 4 shows schematically the optical spectrum reflected by a sensor fibre relative to the Raman anti-Stokes and Stokes signals, according to the present invention.

The filter 20 comprises two passband filters centered on two adjacent portions (spectral windows) pertaining to the Raman spectrum of anti-Stokes optical signals, and produces two optical signals 21 and 22, visible in FIG. 4.

The two adjacent portions are bands of about 50 nm width each, and are spaced apart by about 15 nm. Specifically, the band of the signal 21 is about 60 nm and the band of the signal 22 is about 40 nm.

Alternatively two adjacent portions of Stokes optical signals can be used, although characterised by lesser temperature sensitivity.

The optical signals 21 and 22 are fed to corresponding photodetection systems 23 and 24, preferably an APD (avalanche photo diodes).

The electrical signals provided by the photodetection systems 23 and 24 are applied to the processor 18.

The processor 18 determines the temperature of the sensor fibre 13 using a compensation technique, i.e. a method enabling the temperature measurement to be normalized against possible mechanical losses in the sensor fibre (mechanical stresses such as micro/macro bending phenomena, pressure, splicing).

The processor 18 determines the relationship between the electrical signals provided by the photodetection systems 23 and 24.

When reproduced on a suitable graph, the two signals represent the so-called OTDR curve; by means of the following so-called OTDR equation, this curve relates the power of the retrodiffused signal to the distance at which the signal was generated:

$$P_{Ram\_AS}(l) = P \exp(-\alpha(\lambda_0)) \Gamma(T,\lambda) \tau \exp(-\alpha(\lambda_{AS}))$$

where:

P is the power of the pulse launched into the fibre, $\alpha(\lambda_0)$ is the fibre attenuation coefficient at the excitation signal wavelength, $\alpha(\lambda_{AS})$ is the fibre attenuation coefficient at the retrodiffused Raman anti-Stokes signal wavelength, $\tau$ is the excitation pulse duration and $\Gamma(T,\lambda)$ is the spontaneous Raman scattering (SRS) efficiency, a function of the wavelength and of the temperature T.

The first operation computed on the acquired curves is the conversion from linear scale to logarithmic scale using the following equations:

$$AS\_1(dB) = 20 \log(as\_1)$$

$$AS\_2(dB) = 20 \log(as\_2)$$

where AS_1 and AS_2 are the linear scale curves.

At this point a simple ratio operation is carried out on the two curves. Operating in logarithmic scale, the operation carried out is one of subtraction. The curve obtained from the ratio of AS_1 to AS_2 can be now converted into a temperature curve. This operation is applicable using a conversion coefficient known as sensitivity, calculated experimentally, which relates the signal power to temperature. The last operation carried out is filtration; using a mobile media filter the measurement resolution can be improved without altering the signal band.

The proposed compensation technique is able to completely separate the mechanical effects induced by the fibre from the effects due to temperature alone.

The validity of the proposed technique is confirmed by different experimental measurements which have demonstrated to the Applicant that the ratio between two adjacent spectral windows pertaining to the Raman spectrum remains constant even when faced with a mechanical disturbance induced along the sensor fibre. In particular, it has been noted that this value is substantially constant even against different mechanical variations.

In contrast, analyzing the ratio between two windows pertaining one to the Raman spectrum and the other to the Rayleigh spectrum, it is noted that this value changes to introduce an error contribution into the temperature determination.

According to the present invention, in addition to the facility for effecting a simultaneous temperature and attenuation measurement, a more precise temperature measurement can be obtained, to the advantage of overall system performance.

If an attenuation measurement is not required, but only a temperature measurement, the scheme of FIG. 1 can be used, by eliminating the multiplexer 14 and the photodetection system 17 and connecting the channel 16 directly to the circulator 12.

In a preferred embodiment, the optical filtration circuits 14 and 20 comprise standard telecommunications components, for example formed by thin film technology, which enable temperature measurements to be obtained along long distances with excellent performance, optimal reliability and low cost.

The filters are normally used for signal-pump coupling in optical amplifiers, with stopband WDM filters typically used for attenuation/rejection of signals characterised by a narrow optical spectrum.

Figure 5:
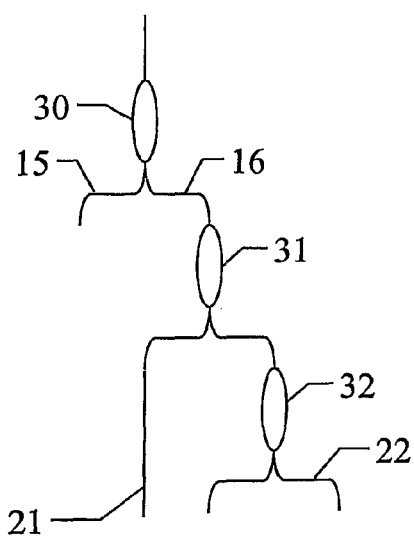
FIG. 5 shows schematically a block scheme of an embodiment of a filter according to the present invention.

With reference to FIG. 5, the signal originating from the circulator 12 is directed to a stopband filter 30 with its band between 1579 nm and 1580 nm, to eliminate Rayleigh component residues.

The attenuation curves for the two channels of the filter 30 are complementary, in the unused filter branch the Rayleigh signal being present such as that present in the channel 15. The filter 30 used was, for example, a filter marketed by Messrs. JDSU with the symbol DWS-2F-514-3P-2-0.

The filter 30 is followed by a WDM filter 31.

The filter 31 presents two output channels, respectively of passband function supplying the signal 21, corresponding to one of the two spectral windows pertaining to the Raman anti-Stokes signal, to the photodetection system 23, and of stopband function, supplying the signal to the next filter 32.

The attenuation curves of the two channels of the filter 31 are complementary and enable the band C (1525 nm-1565 nm) to be separated from the entire optical spectrum. In particular, the passband function enables the entire optical spectrum to be attenuated with the exception of just the band C; in contrast, the stopband function enables just the band C to be attenuated, leaving the remaining spectral components virtually unaltered. The channel of the filter 31 of passband function is used to select a spectral region with a wavelength between 1525 nm and 1565 nm. The filter 31 used was, for example, a filter marketed by Messrs. JDSU with the symbol FWS-F00-10.

The filter 32 presents two output channels, of passband function and, respectively, of stopband function, which is not used.

The purpose of the filter 32 is to select the other of the two spectral regions pertaining to the Raman anti-Stokes band, i.e. the signal 22, characterised by a wavelength less than 1510 nm, a limit fixed by the characteristics of the WDM C/L filter, and to simultaneously attenuate the spectral components not yet attenuated by the filter 31. The filter 31 used was, for example, a filter marketed by Messrs. JDSU with the symbol FWS-A00-2-1-0.

The optical signal 21 supplied to the photodetection system 23 is a signal within the band between about 1525 nm and 1565 nm.

The optical signal 22 supplied to the photodetection system 24 is a signal within the band between about 1450 nm and 1510 nm.

The filter must ensure virtually total attenuation of the retrodiffused Rayleigh signal, typically 30 dB higher than the Raman anti-Stokes component, and the simultaneous attenuation of the Raman Stokes component, typically 3 dB higher than the Raman anti-Stokes component.

Any Rayleigh signal residues introduce undesirable offsets into the temperature measurement which alter the measurement accuracy and precision. The Rayleigh signal must therefore be attenuated to at least 20 dB below the typical powers of the Raman anti-Stokes component, the implemented filter having therefore to ensure total Rayleigh component attenuation of at least 50 dB.

Any Raman Stokes signal residues reduce the measurement temperature resolution $\Delta T$. To ensure a temperature resolution $\Delta T$ of the order of 1° C. the Raman Stokes signal residue must have a power level which is 0.15% less than the total power of the Raman anti-Stokes component. The implemented filter must therefore ensure a total Raman Stokes component attenuation of at least 30 dB. (0.15%=28 dB->28 dB+3 dB=31 dB).

Figure 6:
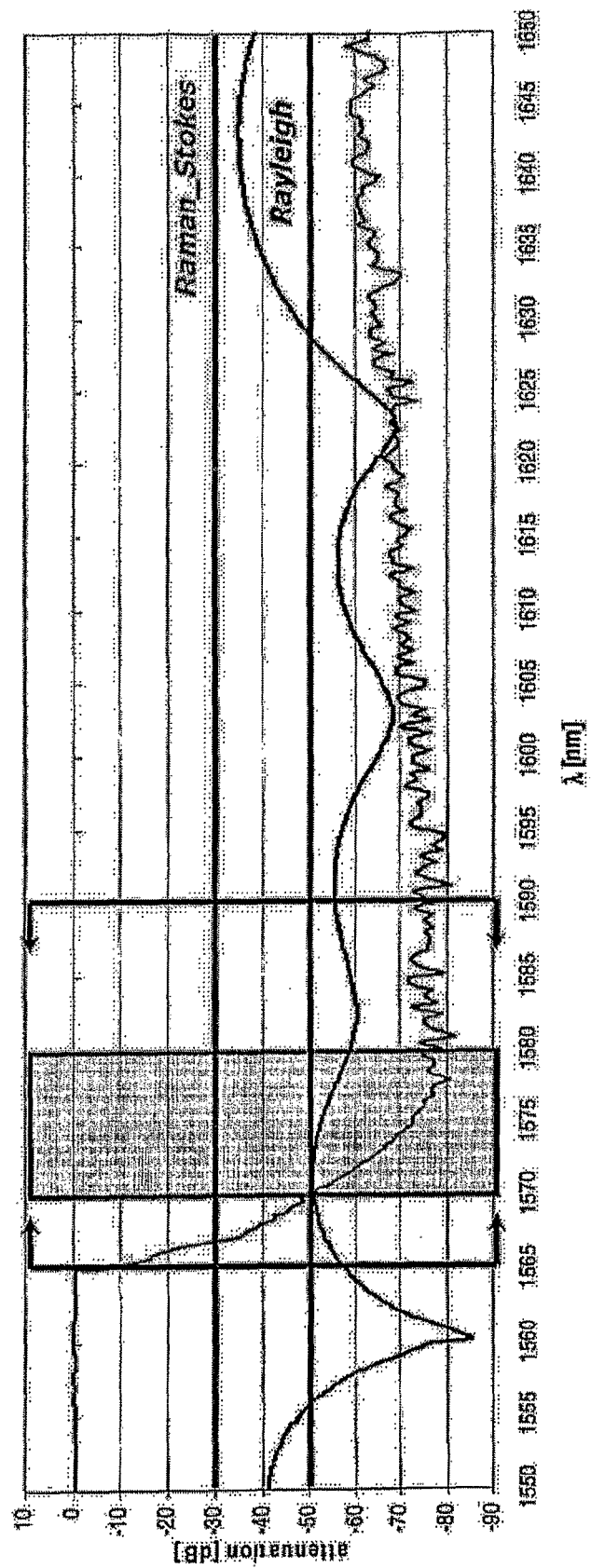
FIG. 6 shows schematically the attenuation curves of the optical filtration circuit, according to the invention.

On the basis of these assumptions and from an analysis of the attenuation curves of the implemented optical filtration circuit, visible in FIG. 6, an optimum wavelength range has been able to be defined for Raman temperature sensor operation.

In particular it can be noted that a first limitation on the wavelength $\lambda_0$ is fixed by the cut-off wavelength of the passband functioning channel of the filter 31. This wavelength, in accordance with ITU specifications, is set at 1565 nm (upper end of band C equal to 1525-1560 nm). Below this wavelength, it would not be possible to obtain the necessary attenuation for the Rayleigh signal component. Moreover because of the previous assumptions, an attenuation of at least 30 dB on the Raman Stokes component and at least 50 dB on the Rayleigh component must be achieved. Although the first condition is easily obtainable on both channels, the second condition is more limiting, especially on the channel 21, and hence sets a second constraint on the operative wavelength $\lambda_0$. It can be noted that the minimum attenuation value (50 dB) is obtained at 1570 nm.

If it is decided to shift the operative wavelength $\lambda_0$ towards the far infrared region, the advantage in terms of attenuation of those spectral components not concerned in the measurement is counteracted by the loss in terms of useful signal attenuation. In this respect, because of infrared absorption phenomena, the average attenuation of the sensor fibre increases considerably, with an obvious penalization of the Raman anti-Stokes components analyzed for temperature determination.

Moreover, by shifting the operative wavelength $\lambda_0$ towards the far infrared region, because of the particular architecture of the implemented optical filtration circuit increasingly smaller portions of the Raman anti-Stokes signal are analyzed, to the detriment of overall sensor temperature resolution $\Delta T$. The power of the excitation signal also decreases. Hence those spectral components not required for the measurement must be attenuated while simultaneously maximizing the analyzed Raman anti-Stokes signal portions, to ensure a temperature resolution $\Delta T$ of the order of 1° C. It has been verified experimentally that above an operative wavelength $\lambda_0$ corresponding to 1580 nm, it is not possible to obtain these temperature resolution $\Delta T$ values.

For the aforesaid reasons, the present invention proposes an operative wavelength range for the operation of a Raman temperature sensor, in particular stating that the probe signal wavelength $\lambda_0$ must be between 1570 nm and 1580 nm.

The choice of an optimum wavelength $\lambda_0$ range for the operation of a Raman optical fibre temperature sensor enables a sensor to be formed using standard optical components satisfying the specifications set by the ITU (International Telecommunication Union) in terms of certified quality and reliability.

The system conceived in this manner is susceptible to numerous modifications and variants, all falling within the scope of the inventive concept; moreover all details can be replaced by technically equivalent elements.

The invention claimed is:

1. An optical fibre temperature sensor comprising: an optical pulse generator generating optical pulses; an optical fibre into which said optical pulses are fed; an optical receiver to receive said optical pulses reflected by said optical fibre and to convert them into an electrical signal; a processor which receives said electrical signal and determines the temperature along said optical fibre; said optical receiver comprising a first filter and a second filter to filter said optical pulse reflected by said optical fibre wherein said first and said second filters are passband filters centered on two adjacent spectral windows of Raman anti-Stokes optical signals or of Raman Stokes optical signals and said two adjacent spectral windows of anti-Stokes optical signals are converted into a first electrical signal and a second electrical signal characterised in that said processor determines the ratio between said first electrical signal and said second electrical signal.

2. A temperature sensor as claimed in claim 1, characterised in that said optical fibre is coupled to a high voltage cable.

3. A temperature sensor as claimed in claim 1, characterised in that said optical pulse generator emits optical pulses within the range of 1570 nm to 1580 nm.

4. A temperature sensor as claimed in claim 3, characterised in that said two adjacent spectral windows lie within the range respectively of about 1450-1510 nm and about 1525-1565 nm.

5. An optical fibre temperature sensor comprising: an optical pulse generator generating optical pulses; an optical fibre into which said optical pulses are fed; an optical receiver to receive said optical pulses reflected by said optical fibre and to convert them into an electrical signal; a processor which receives said electrical signal and determines the temperature along said optical fibre; said optical receiver comprising a first filter and a second filter to filter said optical pulse reflected by said optical fibre wherein said first and said second filters are passband filters centered on two adjacent spectral windows of Raman anti-Stokes optical signals or of Raman Stokes optical signals and further comprising a three-port element, to a first port of which said optical pulse generator is coupled, to a second port of which said optical fibre is coupled, and to a third port of which said at least two filters are coupled characterised in that an optical add drop multiplexer (OADM) is connected between said three-port element and said two filters.

6. A temperature sensor as claimed in claim 5, characterised in that said optical fibre is coupled to a high voltage cable.

7. A temperature sensor as claimed in claim 5, characterised in that said optical pulse generator emits optical pulses within the range of 1570 nm to 1580 nm.

8. A temperature sensor as claimed in claim 7, characterised in that said two adjacent spectral windows lie within the range respectively of about 1450-1510 nm and about 1525-1565 nm.

9. An optical fibre temperature sensor comprising: an optical pulse generator generating optical pulses; an optical fibre into which said optical pulses are fed; an optical receiver to receive said optical pulses reflected by said optical fibre and to convert them into an electrical signal; a processor which receives said electrical signal and determines the temperature along said optical fibre; said optical receiver comprising a first filter and a second filter to filter said optical pulse reflected by said optical fibre wherein said first and said second filters are passband filters centered on two adjacent spectral windows of Raman anti-Stokes optical signals or of Raman Stokes optical signals a three-port element, to a first port of which said optical pulse generator is coupled, to a second port of which said optical fiber is coupled, and to a third port of which said at least two filters are coupled, and further comprising a bandpass filter associated with a drop port for Rayleigh signal filtering.

10. A temperature sensor as claimed in claim 9, characterised in that said optical fibre is coupled to a high voltage cable.

11. A temperature sensor as claimed in claim 9, characterised in that said optical pulse generator emits optical pulses within the range of 1570 nm to 1580 nm.

12. A temperature sensor as claimed in claim 11, characterised in that said two adjacent spectral windows lie within the range respectively of about 1450-1510 nm and about 1525-1565 nm.

13. An optical fibre temperature sensor comprising: an optical pulse generator generating optical pulses; an optical fibre into which said optical pulses are fed; an optical receiver to receive said optical pulses reflected by said optical fibre and to convert them into an electrical signal; a processor which receives said electrical signal and determines the temperature along said optical fibre; said optical receiver comprising a first filter and a second filter to filter said optical pulse reflected by said optical fibre wherein said first and said second filters are passband filters centered on two adjacent spectral windows of Raman anti-Stokes optical signals or of Raman Stokes optical signals, characterised in that said first filter is a stopband filter centered on the Raman anti-Stokes optical signal.

14. A temperature sensor as claimed in claim 13, characterised in that said optical fibre is coupled to a high voltage cable.

15. A temperature sensor as claimed in claim 13, characterised in that said second filter comprises a third and a fourth filter, said third filter being a passband filter centered on a first portion of the anti-Stokes signals, said fourth filter being a stopband filter for blocking said first portion of the anti-Stokes optical signals.

16. A temperature sensor as claimed in claim 15, characterised in that said second filter comprises a fifth filter, coupled to said fourth filter, said fifth filter being a passband filter which supplies a second portion, adjacent to said first portion, of the optical anti-Stokes signals.

17. A temperature sensor as claimed in claim 13, characterised in that said optical pulse generator emits optical pulses within the range of 1570 nm to 1580 nm.

18. A temperature sensor as claimed in claim 17, characterised in that said two adjacent spectral windows lie within the range respectively of about 1450-1510 nm and about 1525-1565 nm.

* * * * *